US008310715B2

(12) United States Patent
Price

(10) Patent No.: US 8,310,715 B2
(45) Date of Patent: Nov. 13, 2012

(54) MECHANISM FOR VERIFYING VARIABLE PRINT DATA

(75) Inventor: Stephen Goddard Price, Longmont, CO (US)

(73) Assignee: InfoPrint Solutions Company, LLC, Boulder, CO (US)

(*) Notice: Subject to any disclaimer, the term of this patent is extended or adjusted under 35 U.S.C. 154(b) by 530 days.

(21) Appl. No.: 12/641,669

(22) Filed: Dec. 18, 2009

(65) Prior Publication Data

US 2011/0149336 A1   Jun. 23, 2011

(51) Int. Cl.
G06K 15/00 (2006.01)
(52) U.S. Cl. .................................. 358/1.18; 358/1.12
(58) Field of Classification Search ............... 358/1.12, 358/1.18
See application file for complete search history.

(56) References Cited

U.S. PATENT DOCUMENTS

| | | | | |
|---|---|---|---|---|
| 5,616,911 | A | * | 4/1997 | Jagielinski ............... 235/493 |
| 6,199,765 | B1 | | 3/2001 | Uhling |
| 6,305,604 | B1 | * | 10/2001 | Ono ....................... 235/380 |
| 6,390,362 | B1 | * | 5/2002 | Martin .................... 235/379 |
| 6,924,906 | B1 | | 8/2005 | Schwier et al. |
| 7,066,669 | B2 | | 6/2006 | Lugg |
| 7,099,029 | B2 | | 8/2006 | Hopper |
| 7,108,183 | B1 | | 9/2006 | Cox, Jr. |
| 7,226,158 | B2 | | 6/2007 | Moore et al. |
| 2002/0012134 | A1 | | 1/2002 | Calaway |
| 2002/0054337 | A1 | | 5/2002 | Makishima et al. |
| 2002/0191208 | A1 | | 12/2002 | Uemura et al. |
| 2003/0133139 | A1 | | 7/2003 | Robinson et al. |
| 2004/0066527 | A1 | | 4/2004 | Kloosterman et al. |
| 2005/0151995 | A1 | | 7/2005 | Hauser et al. |
| 2006/0114500 | A1 | | 6/2006 | Ha |
| 2006/0238793 | A1 | | 10/2006 | Akashi et al. |
| 2006/0291018 | A1 | | 12/2006 | Lang et al. |
| 2007/0022053 | A1 | * | 1/2007 | Waserstein et al. ............ 705/42 |
| 2007/0024882 | A1 | | 2/2007 | Hoffman et al. |
| 2007/0053004 | A1 | | 3/2007 | Calaway |
| 2007/0076234 | A1 | | 4/2007 | Hopper et al. |
| 2007/0098262 | A1 | | 5/2007 | Malik et al. |
| 2007/0120933 | A1 | | 5/2007 | Mueller |
| 2008/0074707 | A1 | | 3/2008 | Cranitch et al. |

FOREIGN PATENT DOCUMENTS

EP  0802527  10/1997
EP  1587018  10/2005

OTHER PUBLICATIONS

"European Search Report", 10167382.0-2210, (Aug. 23, 2010), 6 pages.
Matsumoto, Takeshi, et al., "Development and Verification of a Collaborative Printing Environment", 0-7695-2806-6/07; *Creating, Connecting and Collaborating through Computing*, 2007. C5 '07. The Fifth International Conference., (Jan. 2007), 8 pages.

* cited by examiner

*Primary Examiner* — Twyler Haskins
*Assistant Examiner* — Fred Guillermety
(74) *Attorney, Agent, or Firm* — Blakely, Sokoloff, Taylor & Zafman LLP

(57) ABSTRACT

A printing system is disclosed. The printing system includes a first printer to print to a medium a first type of data and a shadow image of variable data to be printed on the medium, and a second printer to print the variable data to the medium based on the barcode over the shadow image.

20 Claims, 2 Drawing Sheets

MECHANISM FOR VERIFYING VARIABLE PRINT DATA

FIELD OF THE INVENTION

The invention relates to the field of printing, and in particular, to verification of variable data on printed documents.

BACKGROUND

In the printing industry, it is sometimes necessary to process media multiple times in order to create a final product. For example, media such as paper may be pre-printed in an offset press, then run through a digital press/printer in order to add unique (variable) information. In other instances, a digital printer may not have enough capability (e.g., an ink jet printer may not be able to print Magnetic Ink Character Recognition (MICR) data, or a monochrome printer may not be able to print color/highlight color).

In these cases, it may be necessary to process the media through multiple, independent digital printing devices in order to achieve the final product. To highlight their independence, the printing devices may be located in different buildings or countries and having no external network connection. Thus, the printed output may be processed hours or days apart.

When the independent printing systems are generating variable data (e.g., print data changes frequently and is very specific and personal to each piece of media), it is critical that each of the independent systems apply the correct data to the media. For example, the media may be processed in the first printer to apply a name and address in color, then processed in a different printer to add MICR data to be used by a banking system. Therefore, it is extremely important that the variable data printed by the two independent printing systems is matched correctly.

In many instances, there is no way of verifying the output of the second printer to determine if the second printer performed correctly. For example, the second printer may have printed a bank account number in MICR data, but there is no way to verify that the printed account number matches the account holder's name that was printed by the first printer.

Accordingly, a mechanism to verify the accuracy of data printed on the second printer is desired.

SUMMARY

In one embodiment, a printing system is disclosed. The printing system includes a first printer to print to a medium a first type of data and a shadow image of variable data to be printed on the medium, and a second printer to print the variable data to the medium based on the barcode over the shadow image.

In a further embodiment, a method is disclosed including printing a first type of data on a medium at a first printer, printing a shadow image of variable data on the medium at the first printer and printing the variable data on the medium at a second printer over the shadow image.

In another embodiment, a printer is disclosed. The printer includes a reader to read a barcode printed on a medium and a control unit to print variable data read from the barcode over a shadow image of the variable data.

BRIEF DESCRIPTION OF THE DRAWINGS

A better understanding of the present invention can be obtained from the following detailed description in conjunction with the following drawings, in which.

DETAILED DESCRIPTION

A printer verification mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
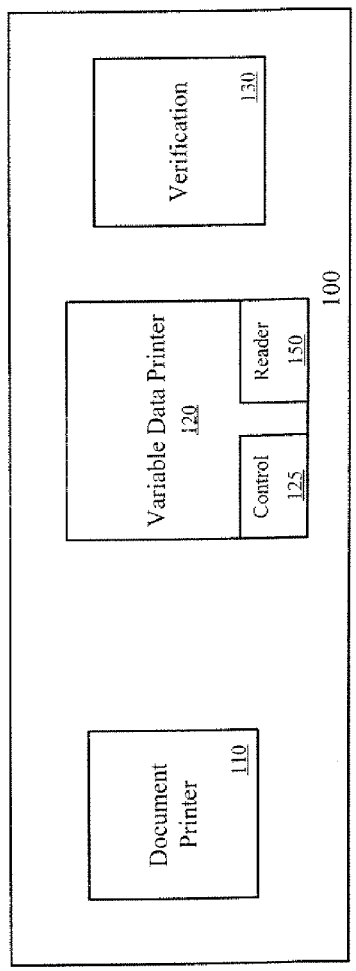
FIG. 1 illustrates one embodiment of a printing system.

FIG. 1 illustrates one embodiment of a printing system 100. Printing system 100 includes a document printer 110, a variable data printer 120 and a verification unit 130. According to one embodiment, printer 110 is a high speed ink jet color printer that is implemented to print image and text data on paper, while printer 120 is a monochrome electrophotographic printer equipped with MICR toner.

In a further embodiment, printer 110 prints the images and text data on check stock for a multitude of bank account holders. For example, printer 110 may print the address, phone number and other account holder specific data, along with one or more selected images, on each check that is printed. However, printer 110 does not have the capability to print other variable data, such as MICR data, since the magnetic ink often clogs the print head of printer 110. Thus, the variable data is later printed on the check at variable printer 120.

In one embodiment, printer 110 prints a barcode on each document. In such an embodiment, the barcode data includes all of the instructions to print the variable data on at printer 120. For example, the barcode includes the variable data (e.g., bank account numbers) that is to be applied to the document at printer 120, as well as the location of the variable data on the document, since the variable data may be printed on the document an indefinite amount of time after being processed at printer 110. In one embodiment, the data within the barcode is encrypted since the data may include confidential or sensitive information.

According to one embodiment, printer 110 prints a shadow (or "ghost") image of the variable data (e.g., MICR characters) on each page in the location at which the MICR characters are to be printed at printer 120. In such an embodiment, the ghost image is printed as lightly-printed filled characters. However in other embodiments, ghost image may be printed as a shadow outline of the characters, or a darkly-printed filled character.

The empty outline of the characters enables the MICR toner at printer 120 to adhere to the printed page without having to adhere to inkjet ink from printer 110. In a further embodiment, ghost image may be printed as ghost characters using the glyphs from a MICR font. In such an embodiment, the ghost image is printed in color, which more noticeable to the human eye. However, the ghost image may also be printed in black.

Figure 2:
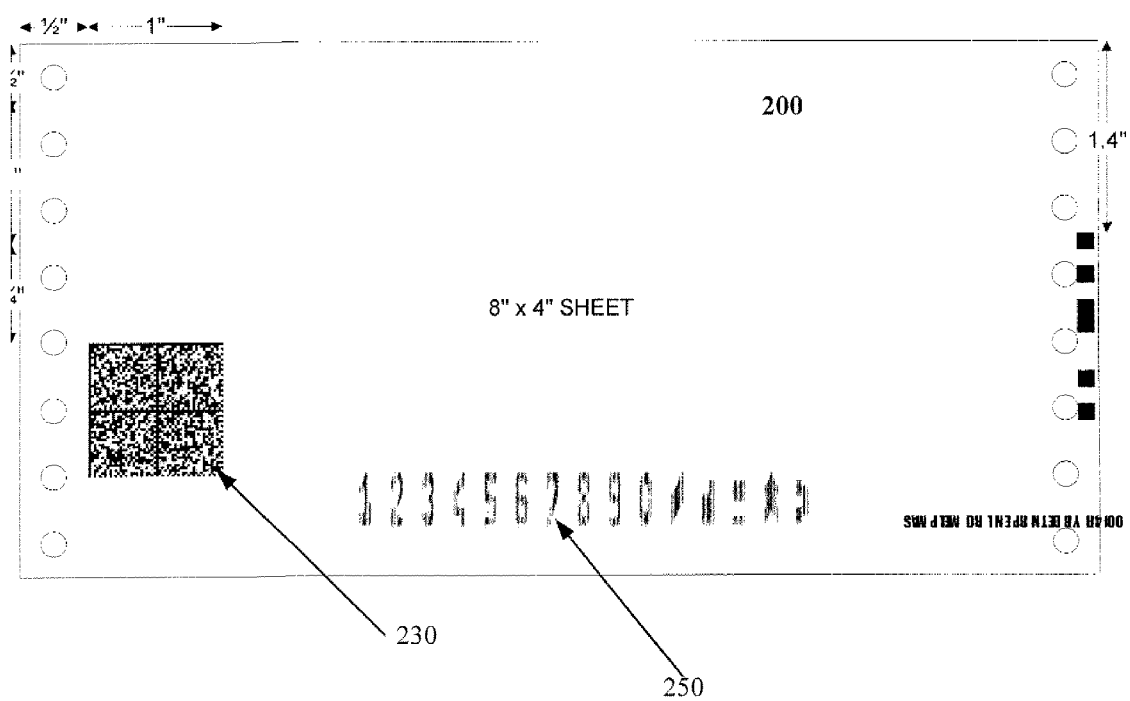
FIG. 2 illustrates one embodiment of a document.

FIG. 2 illustrates one embodiment of a document 200 after it has been processed at printer 110. Document 200 includes a barcode 230 and a ghost image 250 that were printed at printer 110. At some later time the document is placed into printer 120 for printing of the variable data. Printer 120 includes a barcode reader 150 to read barcode 230 in order to retrieve the MICR data for placement on the document.

Figure 3:
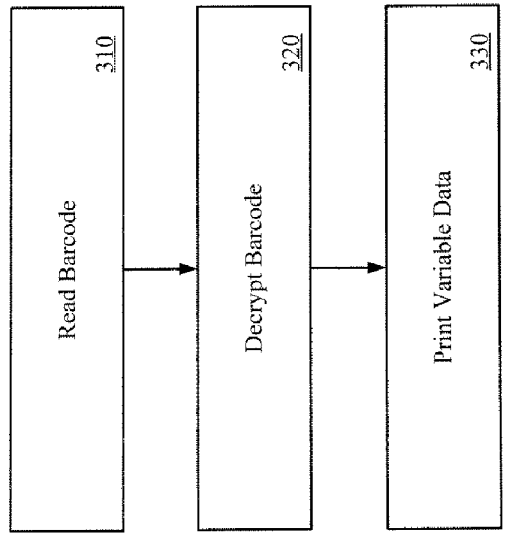
FIG. 3 is a flow diagram illustrating one embodiment of the operation of a printer.

FIG. 3 is a flow diagram illustrating one embodiment of a process performed by a control unit 125 within printer 120. At processing block 310, printer 120 reads the barcode on the document. At processing block 320, the barcode data is decrypted. At processing block 330, the variable data is printed onto the document over the ghost image printed at printer 110.

After printing is completed at printer 120 an error in the MICR data (e.g., registration or incorrect string value) is easily identifiable to a human observer. However when no error occurs, the ghost characters are hidden by the MICR data. In one embodiment, the document is subsequently verified at verification unit 130.

Verification unit 130 may include an optical reader that verifies whether the MICR data matches the ghost image and that it is properly aligned with the ghost image. Verification unit 130 generates and transmits an error message to printer 120 if the MICR data and the ghost image do not match or are improperly aligned. Upon receiving the error message, printer ceases operation and an operator is alerted to the error. Although shown as separate entities, various embodiments may include verification unit 130 within printer 120.

The above-described mechanism enables visual verification that MICR data applied at a second printer is accurate, thus matching text data applied at a first printer. Although described with regards to MICR data, other embodiments may include ghost print for all downstream printing, not just MICR data.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A printing system comprising:
   a first printer to print to a medium a first type of data and a shadow image of variable data to be printed on the medium; and
   a second printer to print the variable data to the medium based on a barcode over the shadow image.

2. The printing system of claim 1 wherein the shadow image is printed as lightly-printed filled characters.

3. The printing system of claim 1 wherein the shadow image is printed as an empty outline of the characters.

4. The printing system of claim 1 wherein the shadow image is printed in color.

5. The printing system of claim 1 further comprising a verification unit to verify that the variable data matches the shadow image.

6. The printing system of claim 1 wherein the first printer prints a barcode on the medium including the variable data to be printed on the medium.

7. The printing system of claim 1 wherein the variable data comprises Magnetic Ink Character Recognition (MICR) data.

8. The printing system of claim 7 wherein the shadow image is printed as a shadow outline of MICR characters.

9. The printing system of claim 8 wherein the first type of data comprises at least one of text data and image data.

10. A method comprising:
    printing a first type of data on a medium at a first printer;
    printing a shadow image of variable data on the medium at the first printer; and
    printing the variable data on the medium at a second printer over the shadow image.

11. The method of claim 10 further comprising verifying that the variable data matches the shadow image.

12. The method of claim 11 further comprising verifying that the variable data is aligned with the shadow image.

13. The method of claim 10 further comprising printing a barcode on the medium at the first printer including the variable data to be printed on the medium at the second printer.

14. The method of claim 10 wherein the variable data comprises Magnetic Ink Character Recognition (MICR) data.

15. The method of claim 10 wherein the first type of data comprises at least one of text data and image data.

16. A printer comprising:
    a reader to read data previously printed on a medium; and
    a control unit to print variable data acquired from the previously printed data over a shadow image of the variable data.

17. The printer of claim 16 further comprising a verification unit to verify that the variable data matches the shadow image.

18. The printer of claim 17 wherein the verification unit verifies that the variable data is aligned with the shadow image.

19. The printer of claim 16 wherein the shadow image is printed as lightly-printed filled characters.

20. The printer of claim 16 wherein the shadow image is printed as a shadow outline of the characters.

* * * * *